United States Patent [19]

Shigeta et al.

[11] Patent Number: 5,078,909
[45] Date of Patent: Jan. 7, 1992

[54] MOISTURE-ABSORBENT COMPOSITIONS AND MOLDED ITEMS

[75] Inventors: Katsumi Shigeta, Ootsu; Hisao Mukai, Naruto; Eiji Isojima, Shiga; Yoshio Saita, Naruto, all of Japan

[73] Assignees: Sasaki Chemicals Co., Ltd., Kyoto; Tomita Pharmaceutical, Tokushima, both of Japan

[21] Appl. No.: 526,817

[22] Filed: May 22, 1990

[30] Foreign Application Priority Data

| May 23, 1989 | [JP] | Japan | 1-130431 |
| Sep. 28, 1989 | [JP] | Japan | 1-254326 |
| Oct. 3, 1989 | [JP] | Japan | 1-259429 |
| Mar. 28, 1990 | [JP] | Japan | 2-77052 |

[51] Int. Cl.$^5$ ............................................. C09K 3/00
[52] U.S. Cl. ........................................ 252/194; 524/423
[58] Field of Search ............... 252/194; 428/323; 524/423

[56] References Cited

U.S. PATENT DOCUMENTS

| 3,832,254 | 8/1974 | Bowser et al. | 156/107 |
| 3,833,406 | 9/1974 | White | 252/194 |
| 4,029,830 | 6/1977 | Yamamoto et al. | 427/57 |
| 4,317,742 | 3/1982 | Yamaji et al. | 252/188 |
| 4,380,501 | 4/1983 | Wojtowicz et al. | 252/186.24 |
| 4,772,422 | 9/1988 | Hijikata et al. | 252/511 |
| 4,792,484 | 12/1988 | Moritani | 428/323 |
| 4,992,510 | 2/1991 | Sugimori et al. | 430/115 |

FOREIGN PATENT DOCUMENTS

| 0172714 | 2/1986 | European Pat. Off. |
| 0225593 | 6/1987 | European Pat. Off. |
| 269410 | 6/1988 | European Pat. Off. |
| 1203458 | 10/1965 | Fed. Rep. of Germany |

OTHER PUBLICATIONS

Patent Abstracts of Japan, vol. 11, No. 69 (C-407) [2516], Mar. 3, 1987.
Patent Abstracts of Japan, vol. 6, No. 191 (C-127) [1069], Sep. 30, 1982.

Primary Examiner—Robert L. Stoll
Assistant Examiner—N. Bhat
Attorney, Agent, or Firm—Nixon & Vanderhye

[57] ABSTRACT

A moisture-absorbent composition contains 100 parts by weight of thermoplastic resin and 5 to 400 parts by weight of at least one among the group consisting of magnesium sulfate (represented generally by MgSO$_4$.N-H$_2$O (O≦n≦3), aluminum oxide, calcium oxide, silicon oxide, zeolite, barium oxide, and cobalt chloride. A moisture-absorbent molded item is formed of this composition in a shape of a film, a sheet, a plate, a bag, a pellet, or a container. The molded item may be used as a cushion insert, etc. which requires moisture absorption properties. A moisture-absorbent composition and an molded item made of the composition are provided with an indicator function, by specifying the amount of anhydrous cobalt chloride.

8 Claims, 9 Drawing Sheets

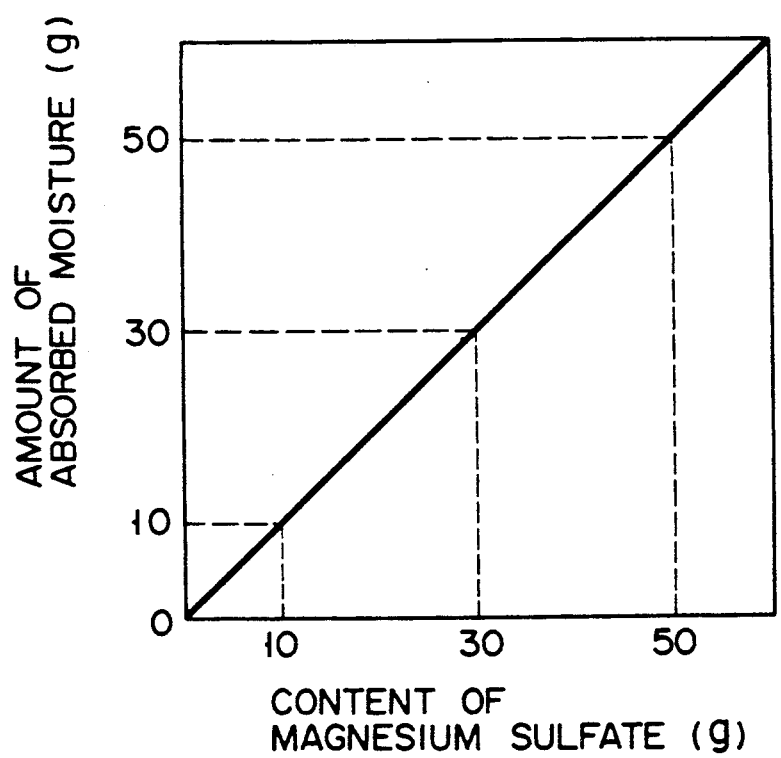
F I G. 1

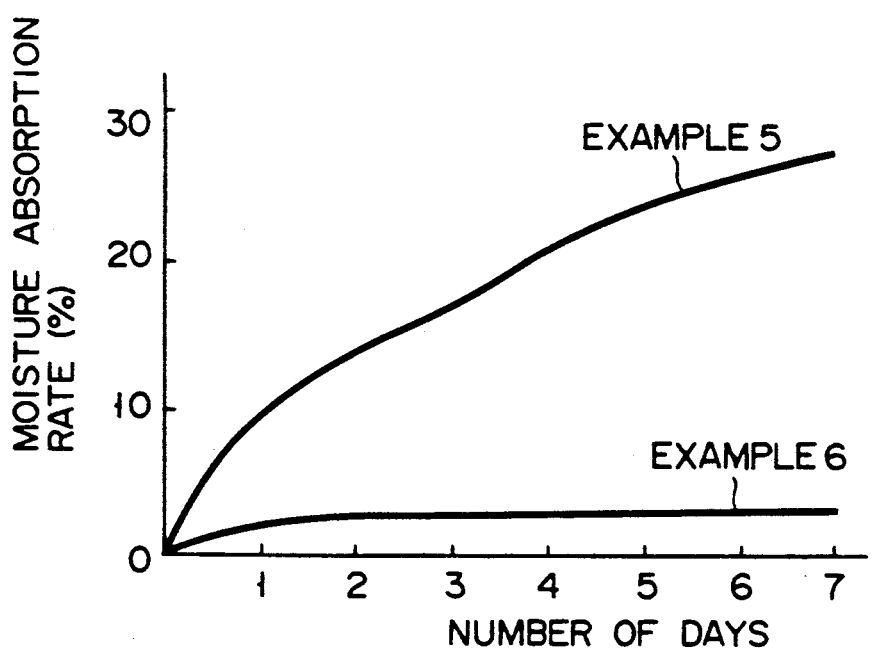
F I G. 4
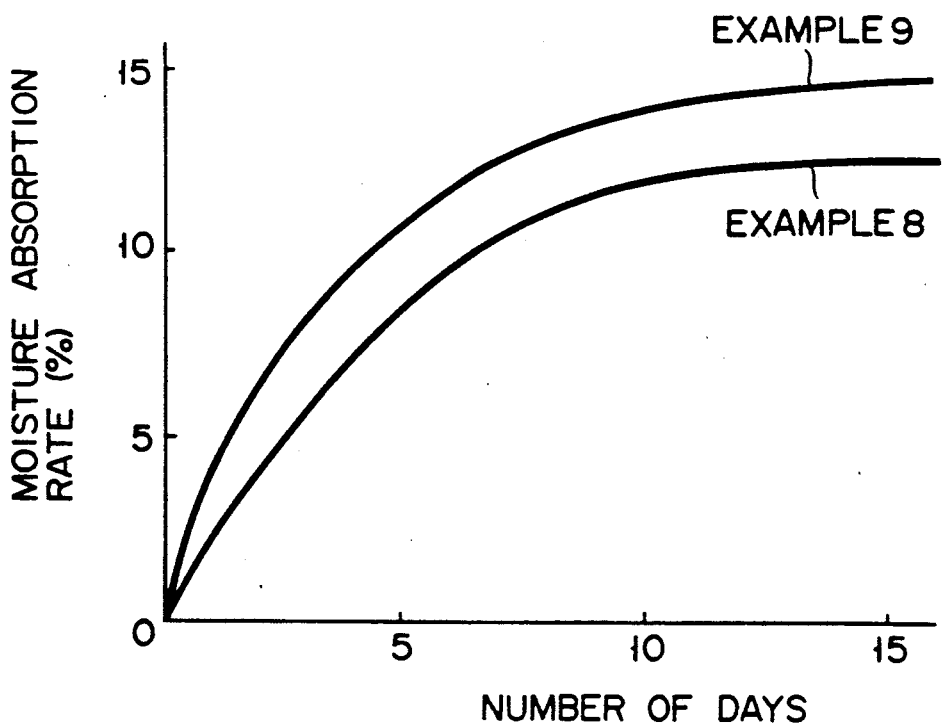
F I G. 7

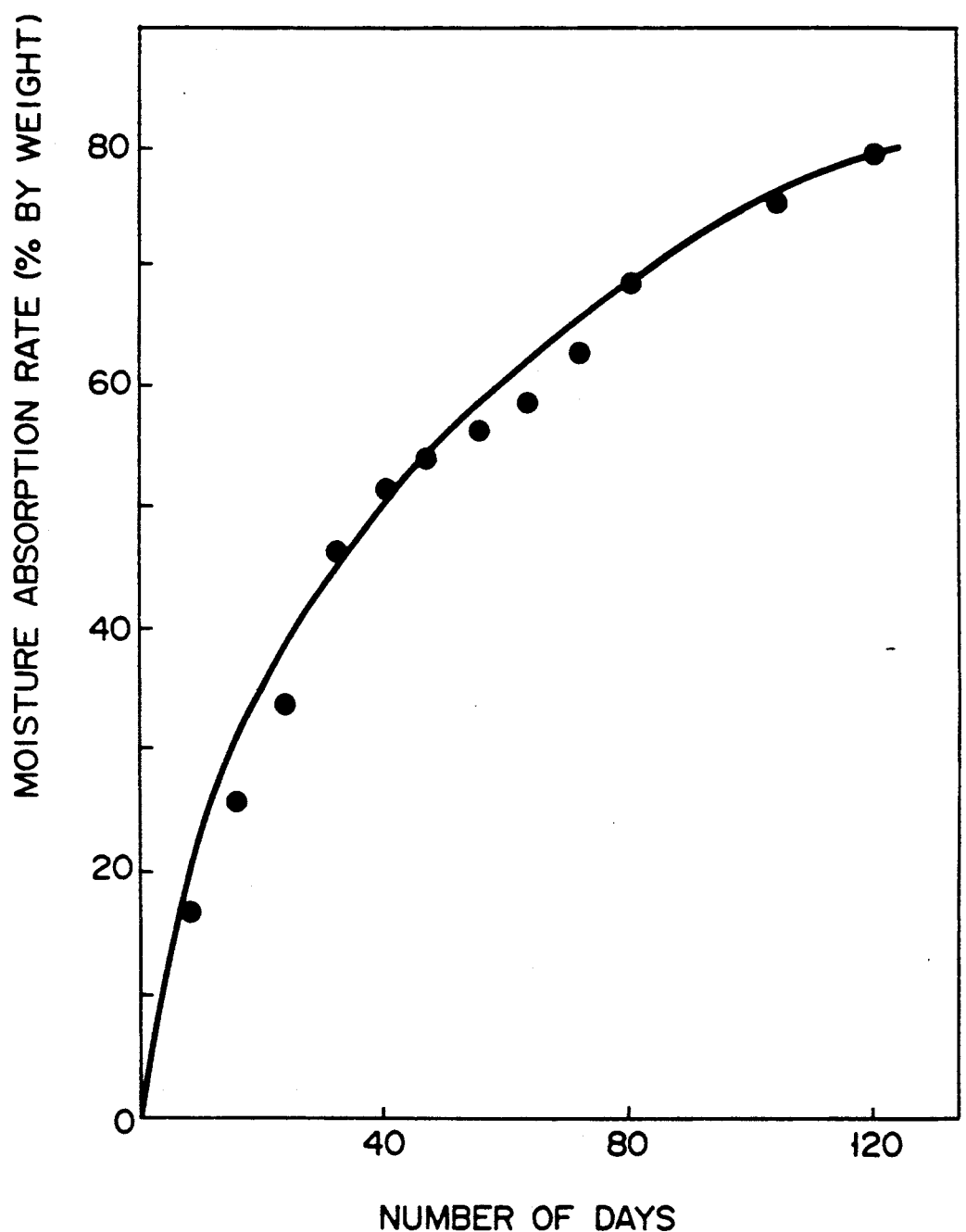
F I G. 8

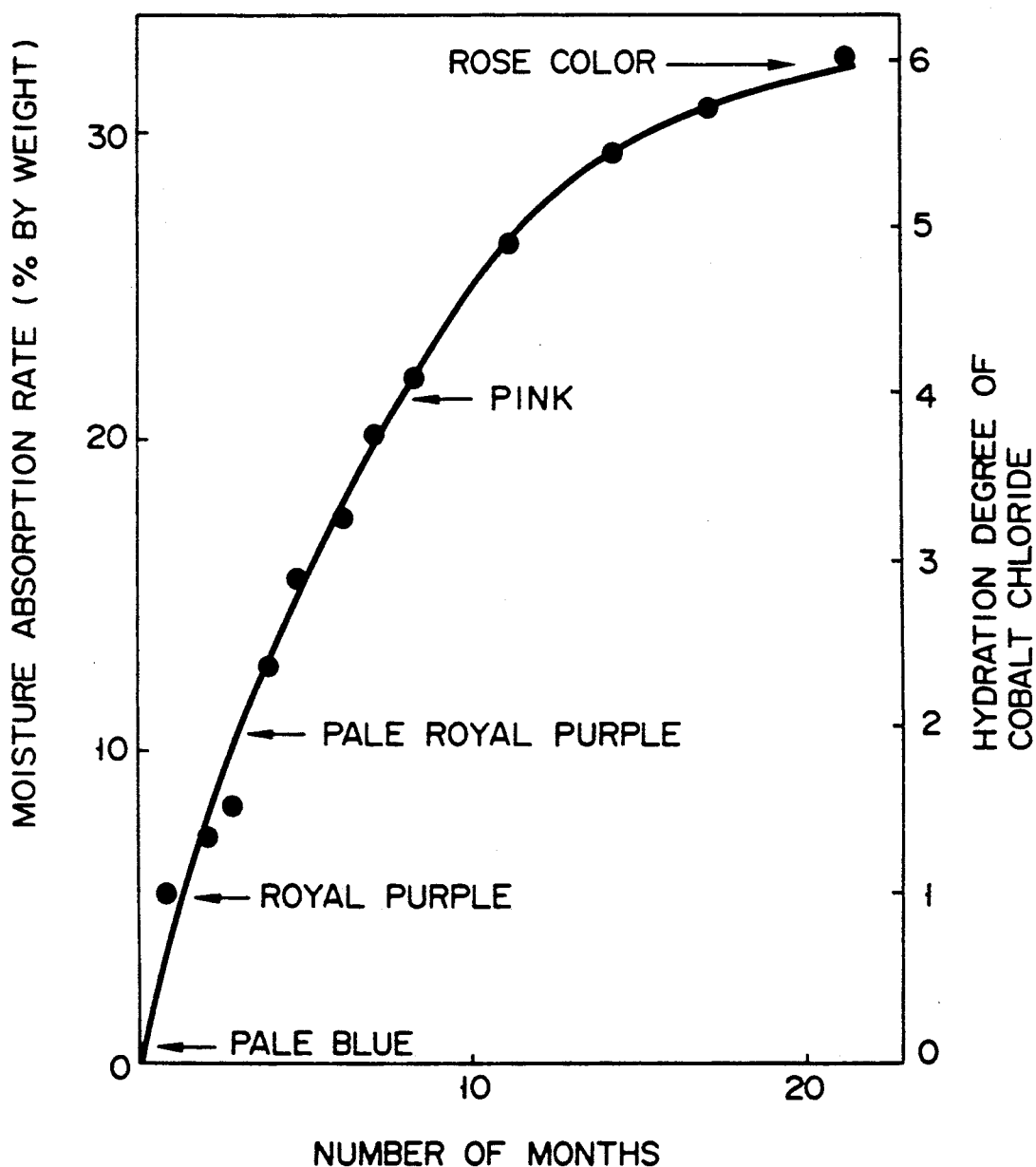
F I G. 10

MOISTURE-ABSORBENT COMPOSITIONS AND MOLDED ITEMS

BACKGROUND OF THE INVENTION

1. Field of the Invention

The present invention relates generally to moisture-absorbent compositions and molded items, and more particularly to those having an indicator function of showing colors changing in accordance with the rate of moisture absorption.

2. Description of the Related Art

Oxidation, corrosion, liquefaction, etc. due to moisture absorption results in degradation in quality of foods, medicines, electronic parts, precision instruments, daily necessaries, etc. To prevent such oxidation, corrosion, etc., these items are contained in water-vaporproof metallic cans or glass bottles, or wrapped with films having a low water vapor permeability and made of polyethylene, extended polypropylene, polyvinylidene chloride, aluminum foil, etc. In addition, desiccants such as silica gel, calcium chloride, quick lime, or zeolite are sealed in such containers or packages. When used, these desiccants are put, in the form of particles or powder, in paper bags, cloth bags, or containers. As a result, the inherent excellent properties of the desiccants are not fully exhibited. If the container of the desiccant is damaged or broken, the desiccant may adhere, or may be kneaded in, the item in the container. Furthermore, the use of a deliquescent desiccant may lead to a liquefaction phenomenon. In addition, it is difficult to examine the moisture absorption effect of the desiccant with the naked eye, and the gradual change of moisture absorption effect cannot be understood.

Published Unexamined Japanese Patent Application No. 61-227818 proposes a technique of preventing a leak of liquid due to moisture absorption liquefaction, wherein micro-porous thermoplastic resin sheet is employed as a packaging material for desiccants. There is also proposed a technique wherein non-woven cloth and composite desiccants are alternately laminated. These techniques, however, have problems such as high costs, trouble in using the desiccant, careless swallow of the desiccant, etc.

SUMMARY OF THE INVENTION

The object of the present invention is to provide compositions and molded items containing desiccants, which have high moisture absorption effect and excellent water-retention for a long period of time, and are free from such drawbacks as fly loss, leakage due to deliquescence, etc. The compositions and molded items according to the present invention have an indicator function, using a substance having a color variable in accordance with the rate of moisture absorption.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a graph showing the relationship between the amount of absorbed moisture and the content of magnesium sulfate;

FIG. 4 is a graph showing the relationship between the moisture absorption rate and the number of days in a moisture absorption test (humidity: 90 %) in Examples 5 and 6;

FIG. 7 is a graph showing the moisture absorption rate and the number of days in a moisture absorption test in Examples 8 and 9;

FIG. 8 is a graph showing the moisture absorption rate and the number of days in a moisture absorption test of a pellet in Example 11;

FIG. 10 is a graph showing the relationship between the moisture absorption rate and the hue in an inner lid of a sealed container in Example 13;

DETAILED DESCRIPTION OF THE PREFERRED EMBODIMENTS

Figure 2:
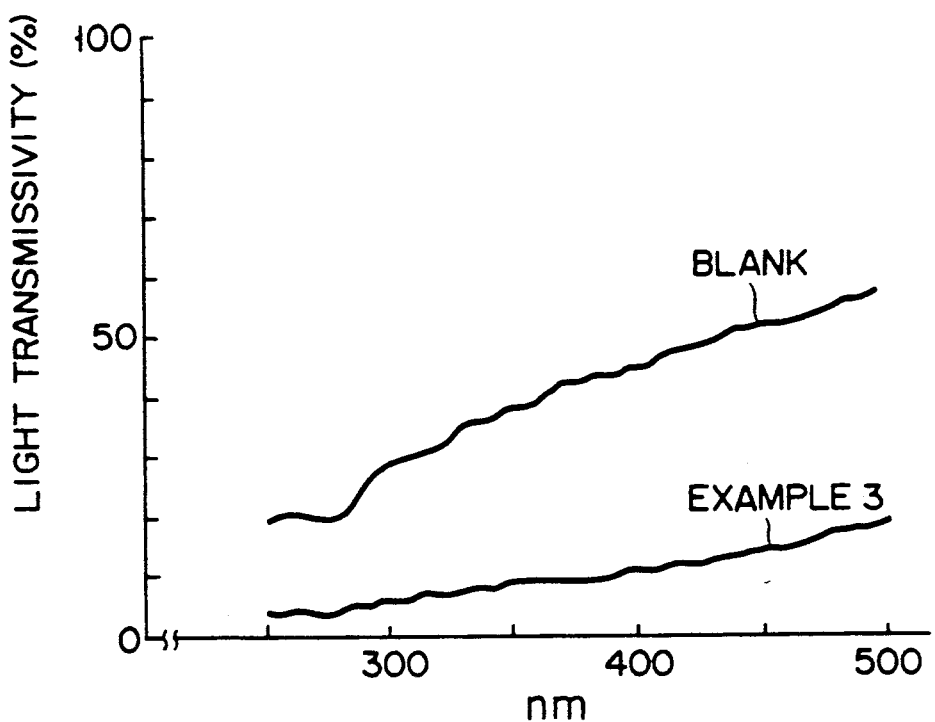
FIG. 2 is a graph showing the light transmissivity of a film in Example 3.
Figure 3:
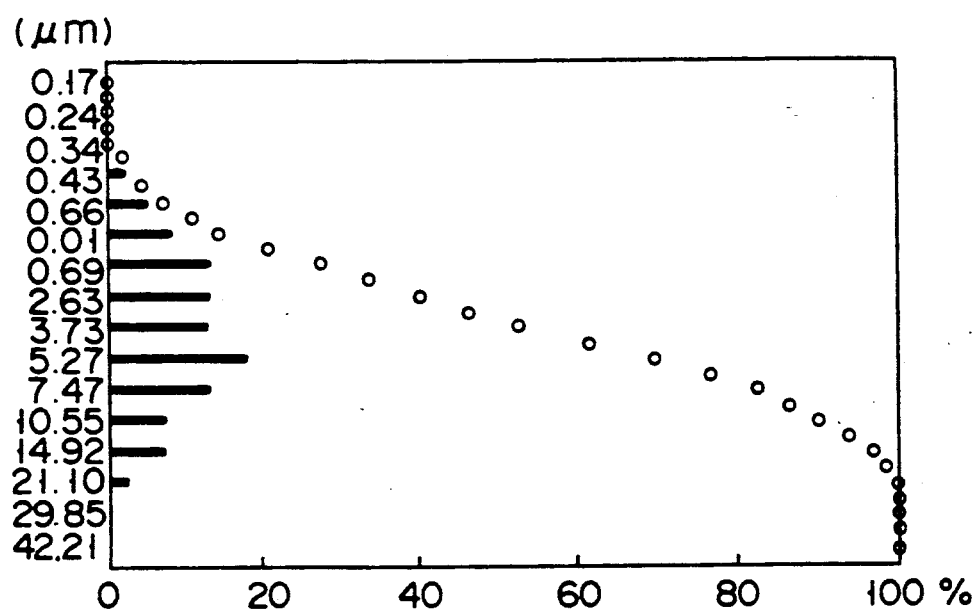
FIG. 3 is a graph showing the measured particle sizes of magnesium sulfate employed in Example 4.

In order to solve the problems, as stated above, the moisture-absorbent composition or molded item according to the present invention contains 100 parts by weight of thermoplastic resin and about 5 to 400 parts by weight of at least one among the group consisting of magnesium sulfate (represented generally by $MgSO_4 \cdot nH_2O$ ($0 \leq n \leq 3$), aluminum oxide, calcium oxide, silicon oxide, zeolite, cobalt chloride, and barium oxide.

The main feature of the present invention resides in that thermoplastic resin is kneaded with a moisture-absorbent substance and, when necessary, a moisture-reactive color-varying substance. The resultant moisture-absorbent composition or molded item may be formed in a desired shape, for example, a film, a sheet, a plate, a bag, a pellet, a container, etc. This composition or molded item itself may serve as a package, and changes its color according to the moisture absorption rate.

A publicly known material ma be used for the thermoplastic resin employed in the present invention. Examples of such material are: polyethylene (PE), polypropylene (PP), polycarbonate, polyamide (PA), etylene-vinyl acetate copolymer (EVA), ethylene-methacrylate copolymer, polyvinyl chloride, polystyrene, polyester, polyacrylic ester, polyvinylidene chloride (PVDC), etc. One or two of these may be used.

The moisture-absorbent substance, combined with the thermoplastic resin, may be one or two among the group consisting of magnesium sulfate (represented generally by $MgSO_4 \cdot nH_2O$ ($0 \leq n \leq 3$), aluminum oxide, calcium oxide, silicon oxide, natural and synthetic zeolite, cobalt chloride, and barium oxide. In particular, magnesium sulfate having excellent dispersion properties in the resin is most desirable.

The moisture-absorbent substances of various particle sizes are available. But the particle size of the moisture-absorbent substance needs to be determined according to the mold item to be produced. For instance, when a film having 50 μm is manufactured, it is necessary to use the substance having the particle size less than 50 μm. If the particle size is greater than 50 μ, the surface of the film becomes uneven due to the exposure the moisture absorbent on the surface of the film, and items to be wrapped in the film may be damaged. Further, the particles may be mixed in the items to be wrapped.

If necessary, particles of different sizes may be mixed. In this case, the amount of the moisture-absorbent substance is about 5 to 40 parts by weight, in relation to 100 parts by weight of thermoplastic resin. As shown in FIG. 1, the amount of absorbed moisture is proportional to the content of anhydride magnesium sulfate, employed as moisture-absorbent substance, in the moisture-absorbent composition or molded item of the invention. The molecular weight of the anhydride magnesium sulfate is just half the molecular weight of the (saturated) hepta-hydrate of magnesium sulfate. Namely, the moisture-absorbent substance in the resin absorbs the same amount of water as the moisture-absorbent substance. In this invention, it is advantageous to mix the moisture-absorbent substance, the amount of which is equal to that of water to be absorbed, in the resin. In this case, the resin having a desired absorption ability can be obtained.

When the amount of the moisture-absorbent substance is about 5 to 40 parts by weight, in relation to 100 parts by weight of thermoplastic resin, the dispersion properties of the moisture-absorbent substance in the resin are excellent. In addition, excellent moisture-absorption properties, water retention properties, and moldability are attained.

Further, an indicator function is realized by adding about 0.5 to 5 parts by weight of anhydride cobalt chloride. The anhydride cobalt chloride is dissolved in a solvent, thus preparing an "indicator solution". The solvent is, for example, a mixture of methanol and glycerin. If the amount of added anhydride cobalt chloride is less than about 0.5 part by weight, the change in color is not clearly observed. If the amount of added anhydride cobalt chloride is more than about 5 parts by weight, the color becomes too deep to be clearly observed.

If the solvent of anhydride cobalt chloride is prepared only of glycerin, the water content of the solvent is too high and the volatility of the solvent is too low. Thus, large part of the indicator solution reacts with the moisture-absorbent substance and also large part of glycerin remains. To solve these problems, the glycerin is mixed with methanol having low water content and high volatility. Inversely, if the amount of methanol is too large, the indicator solution volatilizes too quickly. Thus, it is desirable that the ratio of glycerin to methanol be set to about 1 : 2.

Cobalt chloride is in itself a moisture-absorbent substance. Cobalt chloride can be mixed in resin without losing its moisture absorption property, when the moisture-absorbent composition is formed. However, when the indicator function is to be provided, the amount of anhydride cobalt chloride needs to be limited to about 0.5 to 5 parts by weight, as stated above.

In the moisture-absorbent composition and molded item of the present invention, a foaming agent may be mixed, in addition to the thermoplastic resin, moisture-absorbent substance, and indicator solution. As the foaming agent, publicly known materials can be used: for example, azo-isobutyl-nitrile, azodicarbonamide, 4, 4'-oxybenzene-sulfonylhydrazide, etc. The amount of the foaming agent is preferably abut 0.2 to 10 parts by weight in relation to 100 parts by weight of thermoplastic resin. The moisture-absorbent composition or molded item, obtained by adding the foaming agent thereto, is light in weight and has high moisture absorption properties both in its outer and inner parts. Also, such publicly known additives, as a plasticizer, a stabilizer, a lubricator, and a coloring agent, can be mixed in the composition, as far as the object of the present invention can be achieved.

The moisture-absorbent composition or molded item of the present invention can be prepared by any suitable method. According to a most typical method, the aforementioned thermoplastic resin, moisture-absorbent and, when necessary, indicator solution, as well as other additives, are mixed in a mixer at a temperature of about 100° to 350° C. for about 1 to 40 minutes. The mixture is molded by a molding machine.

In addition to the moisture-absorbent molded item manufactured by the above method, this invention covers a moisture-absorbent molded item obtained by laminating at least one kind of laminating material.

The laminating material may be resins, such as thermoplastic resin, paper, fibers, metals, various coating materials, various adhesives, or various moisture-absorbent molded items.

The type, size (thickness), and number of the laminations are variable, within the scope of the subject matter of the present invention.

The laminating material is used, for example, in the form of a laminated film, a laminated sheet, or a laminated plate.

What follows are examples of the lamination structure (of course, the invention is not limited to them):

LDPE (low-density polyethylene)/MDPE (middle-density polyethylene)
HDPE (high-density polyethylene)/LDPE/HDPE
HDPE/ionomer
PA/ionomer
PP/EVA/PP
PP/EVA/LDPE
PA/adhesive PE/ionomer
PA/adhesive PE/EVA
PA/adhesive PE/HDPE polyethylene)
PA/adhesive LLDPE/LLDPE
PA/adhesive PP/PP
LDPE/PA/EVA
EVA/PVDC/EVA
EVA/PVDC/ionomer
LDPE/adhesive PE/PA The moisture-absorbent composition of the present invention can be combined with at least one of laminating materials, as listed above, having various functions, and consequently molded items suitable for various purposes can be obtained.

The moisture-absorbent compositions and molded items of the present invention have per se lasting moisture absorption effects. Even after the moisture-absorbent substance is mixed with the resin, the resultant mixture does not lose the moisture-absorbent effects, by virtue of the coordinate bond between the mixture and moisture. In addition, the composition or molded item having the indicator function allows visual observation of a gradual change in moisture absorption rate.

The table, stated below, shows changes in color due to moisture absorption rates:

|  | Standard Color | Mixed with Resin Other than Polyamide | Mixed with Polyamide |
|---|---|---|---|
| Anhydride of Cobalt Chloride | Pale Blue | Pale Blue | Nile Blue |
| Hydrate (1) of Cobalt Chloride | Royal Purple | Royal Purple | Pale Royal Purple |
| Hydrate (2) of Cobalt Chloride | Light Purplish | Pale Royal Purple | Grayish Blue |
| Hydrate (4) of Cobalt Chloride | Pink | Pink | Grayish Pink |
| Hydrate (6) of Cobalt Chloride | Rose Color | Rose Color | Light Pink |

When cobalt chloride is mixed in polyamide resin, the color of the composition differs from the standard color (shown in literatures), possibly to the color of resin itself. When cobalt chloride is mixed in resins other than polyamide the color of the composition is substantially identical to the standard color.

Two methods are available for providing the molded item with the indicator function. According to one method, the entire body of the moisture-absorbent molded item changes its color according to humidity. According to the other method, a moisture-absorbent composition having the indicator function is employed as part of the moisture-absorbent molded item (a bag or a container), so that the humidity of the inside of the molded item can be seen from the outside. Of course, it is possible to make a part of a non-moisture-absorbent bag (or container) of a moisture-absorbent composition having the indicator function, so that the humidity of the inside of the bag can be seen from the outside.

In the case where the moisture-absorbent composition is used as material of a cushion insert of a shoe, the cushion insert changes its color according to the amount of moisture absorbed over several months. Thus, the user of the cushion insert can immediately understand the time of replacing the cushion insert. In addition, since the moisture-absorbent effects last for a long lime, this cushion insert is economical.

Examples of the present invention will no be described with reference to FIGS. 1 to 10.

EXAMPLE 1

100 parts by weight of polyethylene (concentration: 0.92 g/cm$^3$), 190 parts by weight of an anhydride magnesium sulfate having an average particle size of 30 μm, and 1 part by weight of stearic acid functioning as a lubricator were mixed and heated at a temperature of 130° C. for 15 minutes by means of an experimental mixing roll. Thus, a sheet 2 mm thick was prepared and the sheet was punched to pellets each having the diameter of 10 mm. Using this pellet as a sample, a moisture absorption test was performed. When the humidity was 90%, the moisture absorption rate was high, i.e. 65%. When the humidity was 50%, the moisture absorption rate lowered to 33%. When the humidity was 20%, the moisture absorption rate further lowered to 3%. Since the humidity was substantially proportional to the humidity absorption rate, it was understood that the produced pellet had excellent humidity control properties and could therefore be used to control humidity.

EXAMPLE 2

100 parts by weight of ethylene-vinyl acetate copolymer (EVA) (average molecular weight: 31000), 50 parts by weight of an anhydride magnesium sulfate having an average particle size of 10 μm, and 1 part by weight of stearic acid functioning as a lubricator were employed to prepare a sheet in the same manner as in Example 1. Using a press roll, the sheet was laminated with polyethylene (average molecular weight: 28000) and aluminum foil, thus forming a sheet 0.1 mm thick. Then, the sheet was subjected to heat seal treatment, and a package bag was manufactured. Using this bag as a sample, a moisture absorption test was performed.

Vegetables, such as leek and broccoli, along with carbonic acid gas, were sealed in the bag. The bag was left for a week at a temperature of 20° C. No waterdrop formed in the bag. It was found that this bag was effective in keeping freshness of vegetables and had excellent moistureproof properties.

EXAMPLE 3

100 parts by weight of ethylene-methyl methacrylate (average molecular weight: 35000), 10 parts by weight of tri-hydrated magnesium sulfate having an average particle size of 6 μm, and 1 part by weight of stearic acid functioning as a lubricator were employed to prepare a pellet in the same manner as in Example 1. The pellet was subjected to extrusion in an extruder, and a film 0.1 mm thick was obtained. Using the film as a sample, a moisture absorption test was performed.

Light having a wavelength of 250 to 500 nm is radiated on the film. FIG. 2 shows the transmissivity of this film, as compared with that of a blank.

As is obvious from FIG. 2, the film of the present invention has high light (ultraviolet) absorption properties. In order to prevent undesirable effects due to ultraviolet, the use of this film as a packaging material is effective.

It was found, by the joint research between the U. S. Department of Agriculture and the Wiseman Research Center of Israel, that ultraviolet effectively destroys protein relating to photosynthesis. The moisture-absorbent composition of the present invention is therefore applicable to vinyl houses, or containers for cosmetics which are easily decomposed by ultraviolet. Conventionally, undesirable effects of ultraviolet have been prevented by the use of a deep color in containers, etc. According to the present invention, users can see the inside of containers, etc.

EXAMPLE 4

100 parts by weight of polystyrene (average molecular weight: 30000), 5 parts by weight of mono-hydrated magnesium sulfate having an average particle size of 3 5

μm, and 0.5 part by weight of azo-isobutyl-nitrile functioning as a foaming agent were kneaded in the sam manner as in Example 1. The mixture was subjected to injection molding. Thus, a foamed item was obtained. Using this as a sample, a moisture absorption test was performed.

EXAMPLE 5

100 parts by weight of polyvinyl chloride (in the form of paste; average molecular weight: 1650), 25 parts by weight of anhydride magnesium sulfate having an average particle size of 10 μm, 80 parts by weight of dioctyl phthalate functioning as a plasticizer, and 2 parts by weight of stearic acid zinc were employed to prepare a film 0.1 mm thick in the same manner as in Example 3. Using this as a sample, a moisture absorption test was performed.

EXAMPLE 6

In Example 5, 25 parts by weight of zeolite (average particle size: 8 μm) were substituted for the anhydride magnesium sulfate. Then, in like manner, a film was prepared, and using this as a sample, a moisture absorption test was performed.

Moisture Absorption Test

The samples prepared in Examples 1 to 6 were left in constant temperature baths having a temperature of 25° C. and having, respectively, humidities of 90%, 50% and 20%. The moisture absorption rates were measured after the lapse of one day, two days, four days, six days, 10 days, 15 days, and 20 days.

The moisture absorption rates are expressed in percentage terms and represent the increase in weight of the samples (in comparison to their initial weights). Table 1 shows the test results obtained when the humidity was 90%; Table 2 shows the test results obtained when the humidity was 50%; and Table 3 shows the test results when the humidity was 20%.

FIG. 4 is a graph showing the relationship between the moisture absorption rates in Examples 5 and 6, in relation to the number of days, when the humidity was

TABLE 1

| Number of Days | (Humidity: 90%) Examples | | | | | |
| --- | --- | --- | --- | --- | --- | --- |
| | 1 | 2 | 3 | 4 | 5 | 6 |
| 1 | 26.5 | 5.2 | 0.4 | 0.7 | 8.9 | 2.4 |
| 2 | 42.9 | 9.8 | 0.8 | 1.5 | 12.8 | 2.4 |
| 4 | 60.4 | 10.4 | 1.4 | 2.6 | 19.5 | 2.4 |
| 6 | 65.1 | 13.5 | 1.8 | 3.0 | 24.2 | 2.4 |
| 10 | 65.3 | 16.3 | 2.3 | 3.8 | 26.0 | 2.4 |
| 15 | 65.4 | 19.4 | 3.4 | 4.3 | 26.4 | 2.4 |
| 20 | 65.4 | 23.0 | 3.8 | 5.1 | 26.4 | 2.4 |
| (Humidity: %) | | | | | | |

TABLE 2

| Number of Days | (Humidity: 50%) Examples | | | | | |
| --- | --- | --- | --- | --- | --- | --- |
| | 1 | 2 | 3 | 4 | 5 | 6 |
| 1 | 14.31 | 2.18 | 0.38 | 0.41 | 4.93 | 1.44 |
| 2 | 21.49 | 3.40 | 0.40 | 0.78 | 7.16 | 1.61 |
| 4 | 30.60 | 5.02 | 0.75 | 1.45 | 12.64 | 1.70 |
| 6 | 33.10 | 6.60 | 0.92 | 1.72 | 13.48 | 1.70 |
| 10 | 33.05 | 9.63 | 1.21 | 2.75 | 14.00 | 1.73 |
| 15 | 33.12 | 9.74 | 1.83 | 2.81 | 14.32 | 1.75 |
| 20 | 33.60 | 9.78 | 2.01 | 2.80 | 14.32 | 1.75 |

TABLE 2-continued

| Number of Days | (Humidity: 50%) Examples | | | | | |
| --- | --- | --- | --- | --- | --- | --- |
| | 1 | 2 | 3 | 4 | 5 | 6 |
| (Humidity: %) | | | | | | |

TABLE 3

| Number of Days | (Humidity: 20%) Examples | | | | | |
| --- | --- | --- | --- | --- | --- | --- |
| | 1 | 2 | 3 | 4 | 5 | 6 |
| 1 | 1.62 | 0.34 | — | — | 0.46 | 1.20 |
| 2 | 2.57 | 0.49 | — | — | 0.55 | 1.20 |
| 4 | 2.76 | 0.61 | — | 0.10 | 0.84 | 1.22 |
| 6 | 2.77 | 0.70 | 0.10 | — | 0.95 | 1.21 |
| 10 | 2.84 | 0.75 | 0.14 | 0.19 | 1.03 | 1.21 |
| 15 | 2.92 | 0.80 | 0.13 | 0.20 | 1.03 | 1.23 |
| 20 | 3.06 | 0.78 | 0.17 | 0.20 | 1.06 | 1.23 |
| (Humidity: %) | | | | | | |

As seen from the tables, when the humidity is high, the moisture absorption rate of magnesium sulfate (Examples 1 to 5) is remarkably high than that of zeolite (Example 6). As is obvious from Table 3, when the humidity is 20%, the moisture absorption rate of zeolite is higher than that of magnesium sulfate. The moisture absorption rate of magnesium sulfate rises in accordance with the increase in number of days, whereas that of zeolite reaches a substantially saturated point at the initial stage. In the above-described cases, the resin, in which the moisture-absorbent substance is kneaded, is soft. The cases of using hard resin will now be discussed in the following examples.

EXAMPLE 7

Three plates of moisture-absorbent substances were produced. First, 100 parts by weight of polyethylene (LDPE: density=0.92 g/cm$^3$) were mixed with 50 parts by weight of anhydrous magnesium sulfate having an average particle size of 4.59 μm. Secondly, 100 parts by weight of polyethylene (LDPE: density=0.92 g/cm$^3$) were mixed with 50 parts by weight of zeolite having an average particle size of 8 μm. Thirdly, 100 parts by 10 weight of polyethylene (LDPE: density=0.92 g/cm$^3$) were mixed with 50 parts by weight of silicon oxide. Using an extruder, each mixture was heated for 15 minutes at a temperature of 130° C., and three types of pellet-like moisture-absorbent substances were obtained. The moisture-absorbent substances were molded to the three plates.

The plates wer used as samples. The moisture absorption rates of the samples were measured, while they were left for on to sixty days in constant temperature baths having a temperature of 25° C. and humidities of 50% and 20%, respectively.

Figure 5:
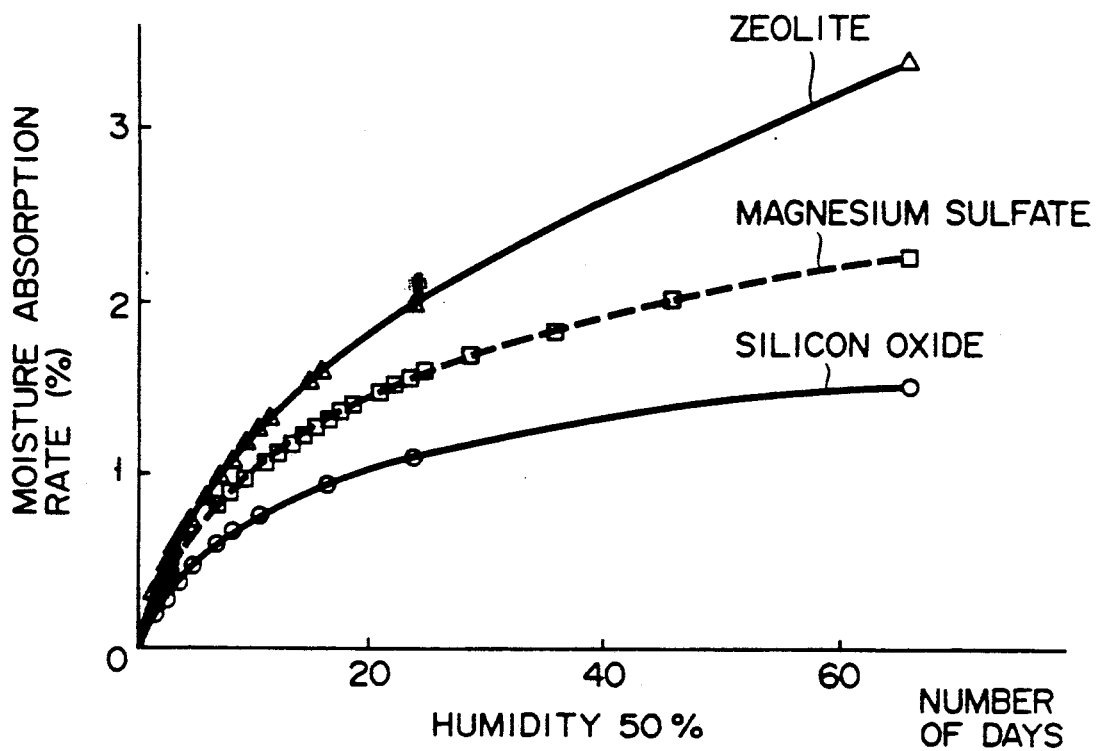
FIG. 5 is a graph showing the moisture absorption rate and the number of days in a moisture absorption test (humidity: 50 %) in Example 7.
Figure 6:
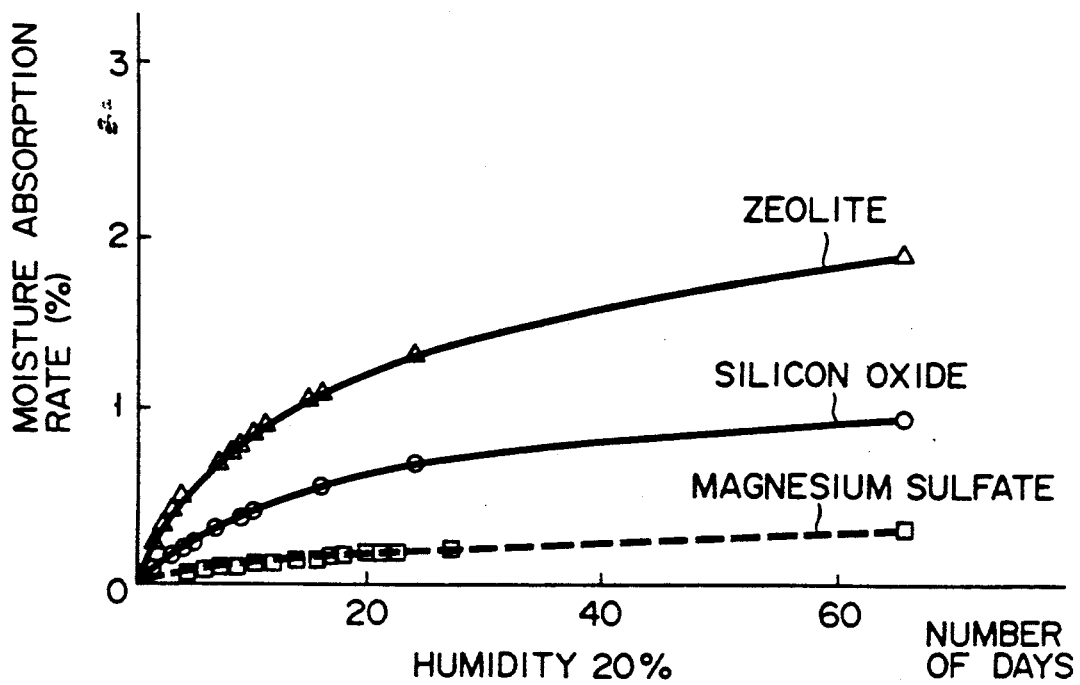
FIG. 6 is a graph showing the moisture absorption rate and the number of days in a moisture absorption test (humidity: 20%) of a pellet in Example 7.

FIG. 5 is a graph showing the moisture absorption rates of the three samples when the humidity was 50%. FIG. 6 is a graph showing the moisture absorption rates of the three samples when the humidity was 20%.

It is seen that, when the humidity is 50%, the moisture absorption rate of zeolite is highest, that of magnesium sulfate follows, and that of silicon oxide is lowest. When the humidity is 20%, the moisture absorption rate of zeolite is highest, that of silicon oxide follows, and that of magnesium sulfate is lowest. It is understood, therefore, that when the humidity is 50% the moisture absorption rate of zeolite mixed in hard resin is higher than that of magnesium sulfate mixed in hard resin.

Depending on the types of the resin mixed with the moisture absorption substance and the humidity, it is necessary to select optimum resin and moisture-absorption substance.

EXAMPLE 8

100 parts by weight of low-density polyethylene (LDPE: density=0.92 g/cm$^3$) and 50 parts by weight of anhydrous magnesium sulfate having an average particle size of 4.59 μm were kneaded and heated at a temperature of 130° C. for 15 minutes by means of a kneading/extruding molder. Thus, pellet-like moisture-absorbent substances were obtained. Then, using an inflation molder, a three-layer film (HDPE: 50 μm/moisture-absorbent substance: 50 μm/LDPE: 10 μm) having an outer layer of high-density polyethylene (HDPE: density=0.95 g/cm$^3$, the same hereinafter) and an inner layer of LDPE.

With the three-layer film (50×50 mm) used as a sample, a moisture absorption test was conducted under the conditions of the temperature of 25° C. and the humidity of 75%. The results of the test are shown in FIG. 7.

A bag., made of the three-layer film by means of heat sealing, absorbed moisture in the bag effectively. In the state where the bag was sealed, the contents of the bag were preserved for a long time.

EXAMPLE 9

100 parts by weight of high-polymeric polyamide (nylon 6, molecular weight=16000) and 50 parts by weight of anhydrous magnesium sulfate having an average particle size of 4.59 μm were employed, to a three-layer film (HDPE: 50 μm/moisture-absorbent substance: 50 μm/LDPE: 10 μm) according to the same process as in Example 8. Using the three-layer film as a sample, a moisture absorption test was conducted. The results of the test are shown in FIG. 7.

A bag, made of the three-layer film by means of heat sealing, absorbed moisture in the bag effectively. In the state where the bag was sealed, the contents of the bag were preserved for a long time.

As is clear from Examples 8 and 9, the bags formed of the three-layer films have high moisture absorption properties.

EXAMPLE 10

A moisture-absorbent substance, HDPE and LDPE, prepared by the same process as in Example 8 were melted with use of three extrusion molders. Then, these were fed to a single die, whereby a three-layer film having the same structure as the film in Example 8. In addition, an aluminum foil was adhered to the outer layer of HDPE. As a result, a four-layer film (Al 7 μm/HDPE 50 μm/moisture-absorbent substance 50 μm/LDPE 10 μm) was prepared.

Two sheets of the four-layer film were superposed on each other and were thermally sealed at their four sides. Thus, a sealed member of 57×88 mm was obtained. The sealed member was left for 24 hours at a temperature of 25° C. and with a humidity of 90%. The moisture permeability of the sealed member from its outer layer was measured. It was found that the moisture permeability was 0.28 g/cm$^2$.

EXAMPLE 11

100 parts by weight of high-polymeric polyamide (nylon 6, molecular weight=16000) and 400 parts by weight of anhydride magnesium sulfate having an average particle size of 5.13 μm were kneaded in a kneading-/extruding molder under the conditions: the cylinder temperature was 225° to 250° C. at 650 mmHg, and the rotation speed of the screw was 60 rpm. Then, the kneaded mass was strand-cut to pellets.

Using the pellets as a sample, the moisture absorption rate was tested under the conditions wherein the temperature was 25° C. and the humidity was 75%. The results of the test are shown in FIG. 8.

According to this invention, 100 parts by weight of resin can be kneaded with 400 parts by weight of moisture-absorbent substance, and excellent moisture absorption properties are exhibited.

EXAMPLE 121

100 parts by weight of high-polymeric polyamide (nylon 6, molecular weight=16000), 50 parts by weight of anhydride magnesium sulfate having an average particle size of 4.59 μm, and 3.14 parts by weight of indicator solution (anhydride cobalt chloride 1.50 parts by weight; methyl alcohol 0.92 part by weight; glycerin 0.73 part by weight) were kneaded in a kneading/extruding molder (PCM 45, two-shaft extrusion molder, manufactured by IKEGAI-TEKKO Kabushiki-Kaisha) under the conditions: the temperature of resin was 163° C., and the rotation speed of the screw was 130 rpm. Then, the kneaded mass was strand-cut to pellets.

Figure 9:
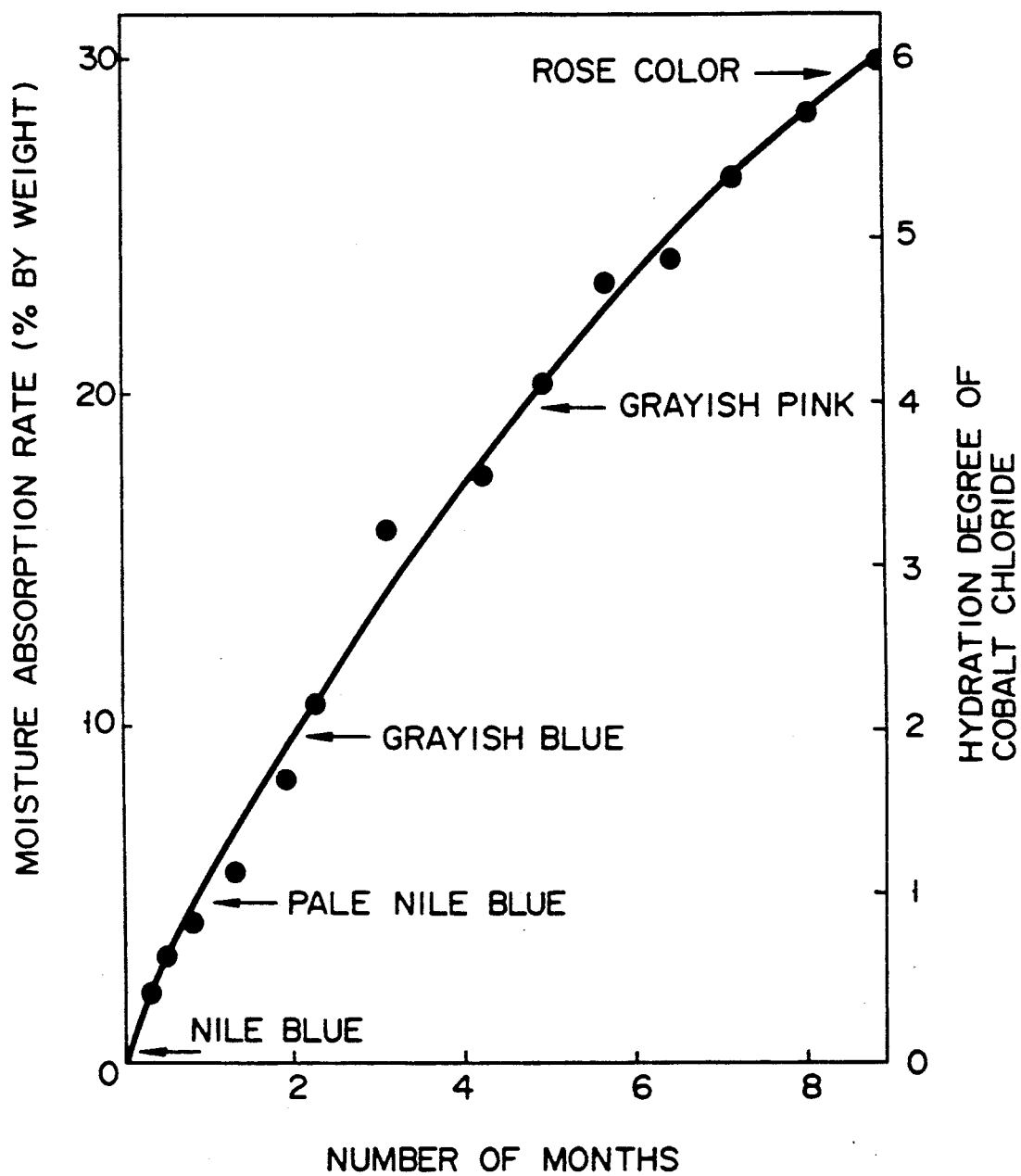
FIG. 9 is a graph showing the relationship between the moisture absorption rate and the hue in a plate used in Example 12.

The pellets were injection-molded by an injection molder (PS40E5ASE, manufactured by NISSEI-JUSHI-KOGYO Kabushiki-Kaisha) to form a plate (85×54×1.5 mm). Using the plate as a sample, the relationship between the moisture absorption rate and the hue was examined under the conditions: the temperature=25° C., and the humidity=75%. The results are shown in FIG. 9.

EXAMPLE 13

100 parts by weight of low-density polyethylene (LDPE: density=0.921 g/cm$^3$), 50 parts by weight of anhydride magnesium sulfate having an average particle size of 4.59 μm, and 12.56 parts by weight of indicator solution (anhydride cobalt chloride 3.00 parts by weight; methyl alcohol 3.68 part by weight; glycerin 2.92 part by weight) were kneaded in a kneading/extruding molder and then hot-cut to pellets. The pellets were injection-molded by an injection-molder (manufactured by TOSHIBA KIKAI Kabushiki-Kaisha) to form. an inner lid(89 mmφ, 1.5 mm thick) of a sealed container.

Using the inner lid as a sample, the relationship between the moisture absorption rate and the hue was examined under the conditions: the temperature=25° C., and the humidity=75%. The results are shown in FIG. 10.

EXAMPLE 14

100 parts by weight of ethylene-methylacrylate copolymer (EMA: density=0.942 g/cm$^3$), 50 parts by weight of anhydride magnesium sulfate having an average particle size of 4.59 μm, and 4.80 parts by weight of indicator solution (anhydride cobalt chloride 1.50 parts by weight; methyl alcohol 1.84 part by weight; glycerin 1.46 part by weight) were kneaded in a kneading/extruding molder and then hot-cut to pellets. The pellets were extruded by the same kneading/extruding molder by means of a T-die method, thereby forming a cushion insert for a shoe.

Figure 11:
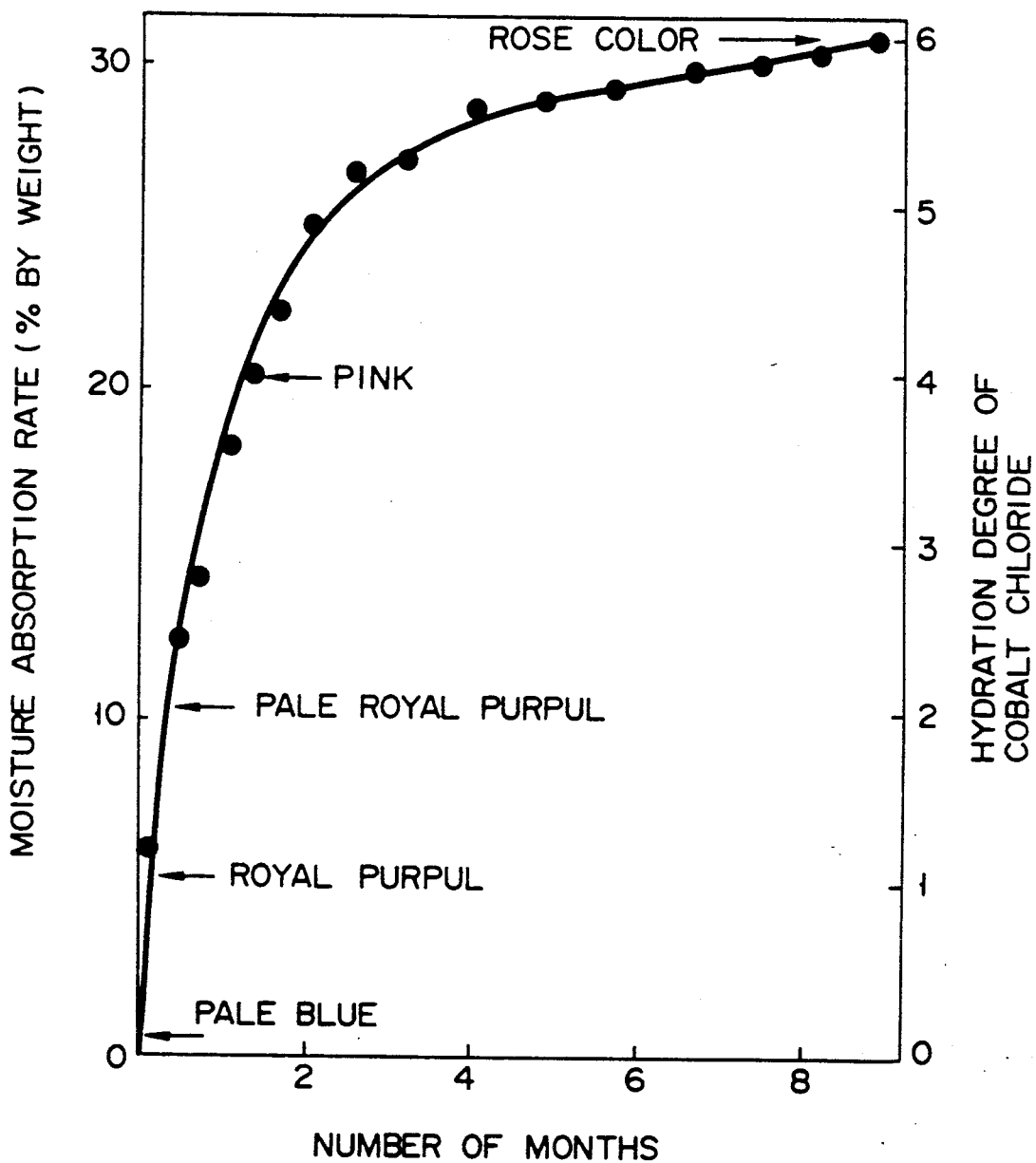
FIG. 11 is a graph showing the relationship between the moisture absorption rate and the hue in an extruded sheet serving as a cushion insert in a shoe employed in Example 14.

Using the cushion insert as a sample, the relationship between the moisture absorption rate and the hue was examined under the conditions: the temperature=25° C., and the humidity=75%. The results are shown in FIG. 11.

EXAMPLE 15

100 parts by weight of low-density polyethylene (LDPE: density=0.92 g/cm$^3$), 25 parts by weight of anhydride magnesium sulfate having an average particle size of 5.13 μm, and 25 parts by weight of zeolite having an average particle size of 74 μm (aluminosilicate) were kneaded in a kneading/extruding molder and then hot-cut to pellets. The pellets were injection-molded to form a plate (85×54×1.5 mm).

Figure 12:
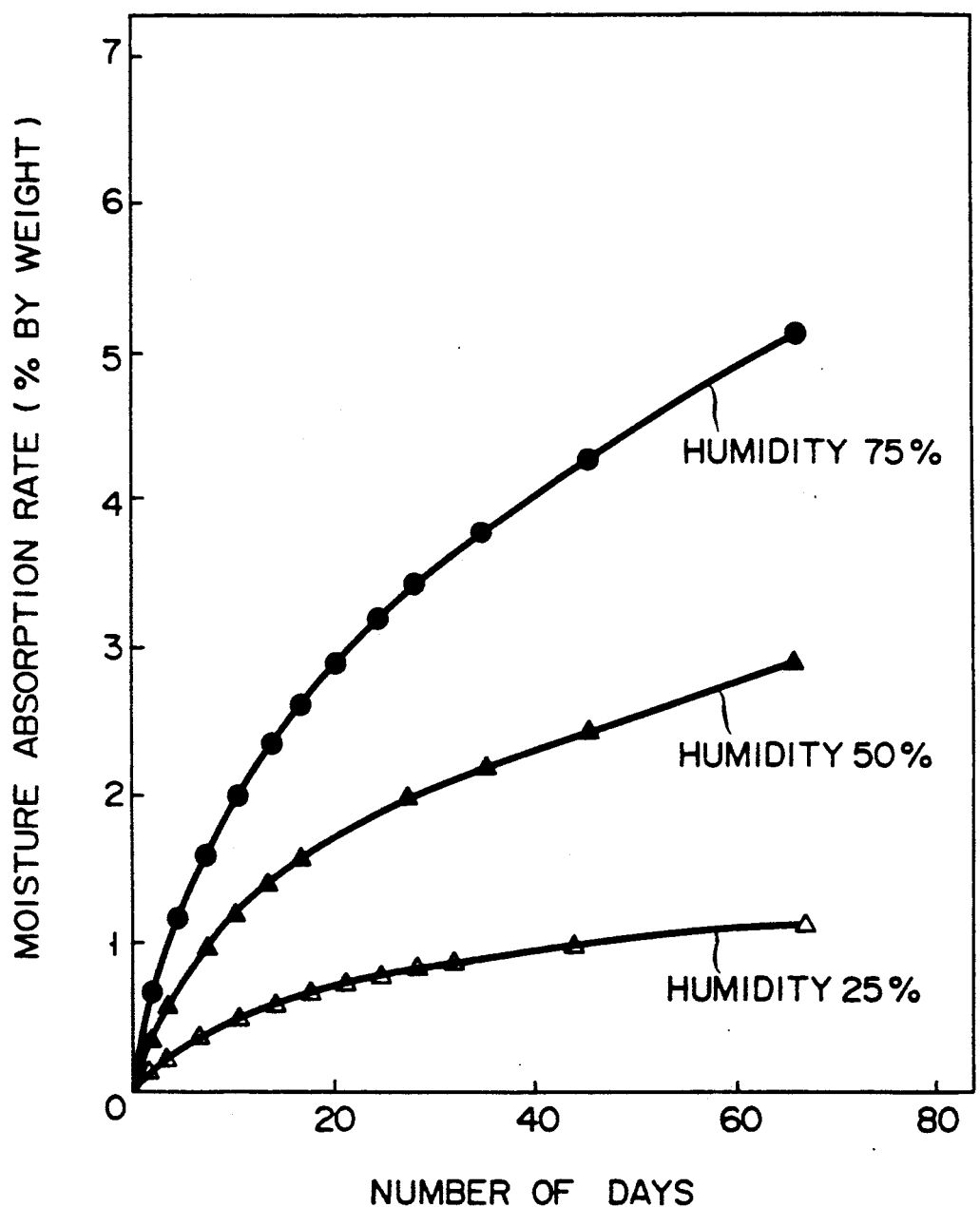
FIG. 12 is a graph showing the relationship between the moisture absorption rate and the number of days in a moisture absorption test for a plate in Example 15.

Using the plate as a sample, the moisture absorption rate was tested under the conditions: the temperature=25° C., and the humidity=75%, 50%, and 20%. The results are shown in FIG. 12.

From the results, it is clear that even if two or more moisture-absorbent substances are mixed in resin, excellent moisture absorption properties are exhibited at each humidity.

As is shown in the above-described examples, the moisture-absorbent composition of the present invention is easily processed and molded in a desired shape. Even if the composition is subjected to various types of molding, good moisture absorption properties are maintained, and the change of color corresponding to humidity can be visually observed.

The moisture-absorbent composition and the molded item thereof according to this invention have the following features:

1) The composition has high moisture-absorbent properties and water retention, and is free from corrosion, fly loss, leakage due to deliquescence, or waterdrops. Therefore, the composition and the molded item thereof are excellent in safely and stability.

2) At the time of use, it is not necessary to wrap the molded item, unlike the case of a conventional moisture absorbent element. If the molded item is manufactured as a bag or a container, the bag or container itself serves conveniently as an moisture-absorbent substance.

3) The amount of moisture absorbed in the molded item is immediately understood by the change in color. The time at which the molded item should be replaced can be understood at a glance.

4) The moisture absorption effects last for a long time.

5) When the composition is molded to a cushion insert, the insert can absorb moisture for a long time, and the time at which the insert should be changed can be seen at a glance.

6) The manufacture and processing is easy, resulting in high productivity. The moisture absorption effects do not reduce owing to the processing or molding.

7) When the composition is molded to a film, the film may be laminated, foamed, or colored. The heat sealing properties of the film are excellent. The film may be laminated with a layer having a low vapor permeability. The film absorbs ultraviolet excellently (see FIG. 1).

8) The composition may be used as a dehydrating agent to be used in an organic solvent.

9) The composition has light-shield properties, electrification-prevention properties, and deodorant properties.

As has been described above, the moisture-absorbent compositions and molded items can be widely used a moisture-absorbent agents or moisture-absorbent packaging materials for protecting the quality of foods, medicines, cosmetics, luxuries, precision instruments, mechanical parts, etc.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

What is claimed is:

1. A moisture-absorbent composition consisting essentially of 100 parts by weight of thermoplastic resin and about 5 to about 400 parts by weight of magnesium sulfate (represented by the formula MgSO$_4$·nH$_2$O ($0 \leq n \leq 3$) having an average particle size of at most 30 μm.

2. A moisture-absorbent composition consisting essentially of 100 parts by weight of thermoplastic resin, magnesium sulfate (represented by the formula MgSO$_4$·nH$_2$) ($0 \leq n \leq 3$) having an average particle size of at most 30 μm and at least one member selected from the group consisting of aluminum oxide, calcium oxide, silicon oxide, zeolite, barium oxide and cobalt chloride, the total amount of said magnesium sulfate and said at least one member being about 5 to about 400 parts by weight.

3. A moisture-absorbent molded item including the moisture-absorbent composition according to claim 1.

4. A moisture-absorbent composition having an indicator function, containing 100 parts by weight of thermoplastic resin, magnesium sulfate (represented by the formula MgSO$_4$·nH$_2$O ($0 \leq n \leq 3$) having an average particle size of at most 30 μm and at least one member selected from the group consisting of aluminum oxide, calcium oxide, silicon oxide, zeolite and barium oxide and 0.5 to 5 parts by weight of anhydrous cobalt chloride, total amount of said magnesium sulfate and said at one member being about 5 to about 400 parts by weight.

5. A moisture-absorbent molded item having an indicator funciton, including the moisture-absorbent composition according to claim 4.

6. The moisture-absorbent composition according to claim 1 wherein said composition contains a foaming agent.

7. The moisture-absorbent composition according to claim 1, wherein said composition has an indicator function and further contains 0.5 to 5 parts by weight of anhydrous cobalt chloride.

8. The moisture absorbent composition according to claim 2, which further contains a foaming agent.

* * * * *